United States Patent
Zhu et al.

(10) Patent No.: US 9,319,118 B2
(45) Date of Patent: Apr. 19, 2016

(54) TECHNOLOGY FOR CSI FEEDBACK IN A MIMO COMMUNICATION SYSTEM

(76) Inventors: Yuan Zhu, Beijing (CN); Xiaogang Chen, Beijing (CN); Qinghua Li, San Ramon, CA (US)

(*) Notice: Subject to any disclaimer, the term of this patent is extended or adjusted under 35 U.S.C. 154(b) by 0 days.

(21) Appl. No.: 13/994,745

(22) PCT Filed: Dec. 19, 2011

(86) PCT No.: PCT/US2011/065853
§ 371 (c)(1),
(2), (4) Date: Dec. 27, 2013

(87) PCT Pub. No.: WO2012/148478
PCT Pub. Date: Nov. 1, 2012

(65) Prior Publication Data
US 2014/0112406 A1  Apr. 24, 2014

Related U.S. Application Data

(63) Continuation of application No. PCT/US2011/053683, filed on Sep. 28, 2011.

(60) Provisional application No. 61/523,080, filed on Aug. 12, 2011, provisional application No. 61/481,024, filed on Apr. 29, 2011.

(51) Int. Cl.
*H04B 7/04* (2006.01)
*H04B 7/06* (2006.01)
*H04L 1/00* (2006.01)

(52) U.S. Cl.
CPC ............ *H04B 7/0452* (2013.01); *H04B 7/0417* (2013.01); *H04B 7/0456* (2013.01);
(Continued)

(58) Field of Classification Search
CPC .... H04B 7/024; H04B 7/0689; H04B 7/0478; H04B 7/0482; H04B 7/0486; H04B 7/0452; H04B 7/0621; H04B 7/0639
See application file for complete search history.

(56) References Cited

U.S. PATENT DOCUMENTS 8,605,905 B2   12/2013  Liu et al.
8,654,740 B2    2/2014  Zhu et al.
(Continued)

FOREIGN PATENT DOCUMENTS

WO    2012/148478 A1    11/2012

OTHER PUBLICATIONS

International Preliminary Report on Patentability received for PCT Patent Application No. PCT/US2011/065853, mailed on Nov. 7, 2013, 8 pages.
3GPP, "Evolved Universal Terrestrial Radio Access (E-UTRA); Physical Channels and Modulation", 3GPP TS 36.211 V10.1.0 (Mar. 2011), Release 10, Mar. 2011, 103 pages.
3GPP, "Evolved Universal Terrestrial Radio Access (E-UTRA); Multiplexing and Channel Coding", 3GPP TS 36.212 V10.1.0, Mar. 2011, 76 pages.
(Continued)

*Primary Examiner* — Aristocratis Fotakis
(74) *Attorney, Agent, or Firm* — Thorpe North & Western LLP

(57) ABSTRACT

Technology for channel state information (CSI) feedback in a multiple-input multiple-output (MIMO) communication system is disclosed. A method comprises receiving, at a mobile device, a dynamic channel state information (CSI) feedback switch signal from a transmission station that identifies a selected CSI feedback state for the mobile device. A process for selecting a precoding matrix indicator (PMI) and a rank indicator is identified based on the CSI feedback switch signal as either a process configured for MU-MIMO reception or single-user (SU) MIMO reception of a downlink signal at the mobile device.

19 Claims, 7 Drawing Sheets

(52) U.S. Cl.
CPC ............ *H04B 7/0486* (2013.01); *H04B 7/0626* (2013.01); *H04B 7/0639* (2013.01); *H04L 1/0031* (2013.01); *H04B 7/0478* (2013.01)

(56) References Cited

U.S. PATENT DOCUMENTS

| | | | |
|---|---|---|---|
| 8,705,472 | B2 | 4/2014 | Taoka et al. |
| 2008/0025336 | A1 | 1/2008 | Cho et al. |
| 2008/0279296 | A1* | 11/2008 | Roh et al. ................. 375/260 |
| 2009/0268698 | A1 | 10/2009 | Lee et al. |
| 2010/0067480 | A1* | 3/2010 | Wang et al. ............... 370/330 |
| 2010/0157924 | A1 | 6/2010 | Prasad et al. |
| 2010/0215114 | A1 | 8/2010 | Kim et al. |
| 2010/0239034 | A1* | 9/2010 | Lee et al. ................. 375/260 |
| 2011/0013581 | A1 | 1/2011 | Lee et al. |
| 2011/0032839 | A1* | 2/2011 | Chen et al. ................ 370/252 |
| 2011/0080965 | A1 | 4/2011 | Liu et al. |
| 2011/0085503 | A1* | 4/2011 | Nam et al. ................. 370/329 |
| 2011/0142147 | A1* | 6/2011 | Chen et al. ................ 375/260 |
| 2011/0194504 | A1* | 8/2011 | Gorokhov et al. ............ 370/329 |
| 2012/0051544 | A1 | 3/2012 | Liu et al. |
| 2012/0106470 | A1 | 5/2012 | Clerckx et al. |
| 2012/0270535 | A1* | 10/2012 | Chen et al. ................. 455/422.1 |
| 2013/0287139 | A1 | 10/2013 | Zhu et al. |
| 2013/0343328 | A1 | 12/2013 | Nilsson et al. |
| 2014/0140235 | A1* | 5/2014 | Park et al. ................. 370/252 |

OTHER PUBLICATIONS

3GPP "Evolved Universal Terrestrial Radio Access (E-UTRA); Physical Layer Procedures", 3GPP TS 36.213 V10.1.0, Mar. 2011, 115 pages.

Potevio, "Discussion on DL Control Signaling for Dual-layer Beamforming", 3GPP TSG RAN WG1 # 58, R1-093441, Shenzhen, China, Aug. 24-28, 2009, 3 pages.

Alcatel-Lucent Shanghai Bell and Alcatel-Lucent, "Discussion of CQI/PMI reporting enhancement on PUSCH for SU/MU-MIMO scheduling" 3GPP TSG RAN WG1 Meeting # 62 bis, R1-105754, Xi' an, China, Oct. 11-15, 2010, pp. 1-11.

Texas Instruments, "Multiple PMI feedback for dynamic SU/MU switching", 3GPP TSG-RAN WG1 # 61, R1-102824, Montreal, Canada, May 10-14, 2010, 3 pages.

International Search Report and Written Opinion received for PCT application No. PCT/US2011/065853, mailed on Jul. 31, 2012, 13 pages.

3GPP; 3$^{rd}$ Generation Partnership Project; Technical Specification Group Radio Access Network; Evolved Universal Terrestrial Radio Access (E-UTRA); Physical layer procedures; 3GPP TS 36.213 v10.2.0; Jun. 2011; 120 pages; Release 10.

PCT application PCT/US2011/053683; filing date Sep. 28, 2011; Intel Corporation et al.; International Search Report mailed May 4, 2012.

* cited by examiner

FIG. 4a
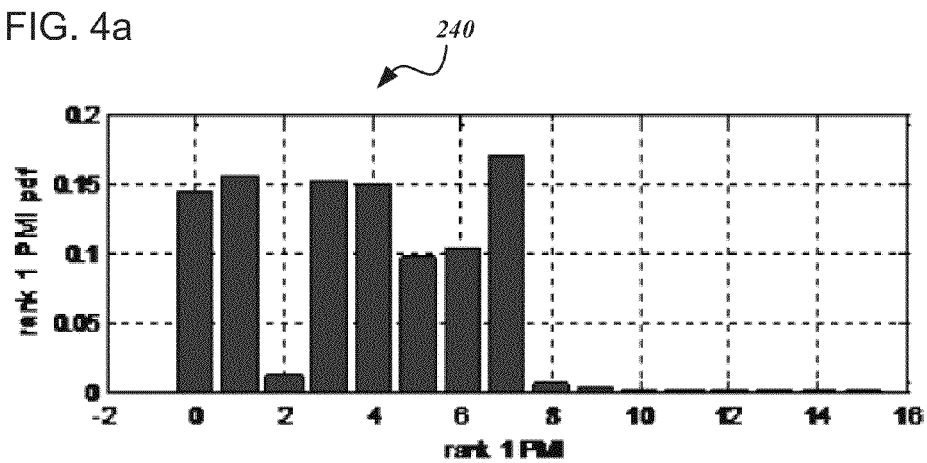
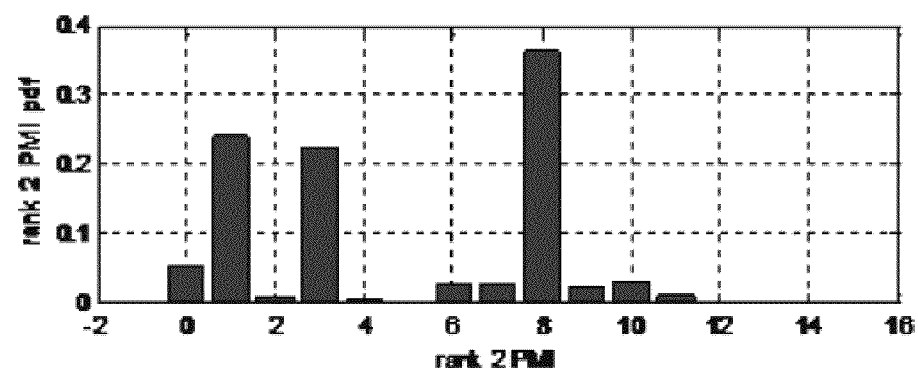
FIG. 4b

TECHNOLOGY FOR CSI FEEDBACK IN A MIMO COMMUNICATION SYSTEM

This application claims priority to U.S. Provisional patent application Ser. No. 61/523,080, filed on Aug. 12, 2011, and is a continuation-in-part of United States patent application Serial No. PCT/US2011/053683, filed on Sep. 28, 2011, which claims priority to U.S. provisional patent application Ser. No. 61/481,024, filed on Apr. 29, 2011, all of which are incorporated by reference herein in their entirety.

BACKGROUND

The use of multiple input multiple output (MIMO) technology has attracted increased attention for use in wireless communications systems because MIMO offers significant increases in data throughput and link range without requiring additional bandwidth or transmit power. The increased performance afforded by MIMO technology stems from higher spectral efficiency (greater number of bits transmitted per second per Hertz of bandwidth), as well as greater link reliability or diversity. Accordingly, MIMO forms an important part of modern wireless communications standards including 3GPP Long Term Evolution Release 8 (2008), Release 9 (2009); and Release 10 (2011), IEEE 802.11n, 802.16m (2009) and HSPA+.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 4a and 4b present a comparison of known rank 1 and rank 2 PMI distributions;

Figure 1:
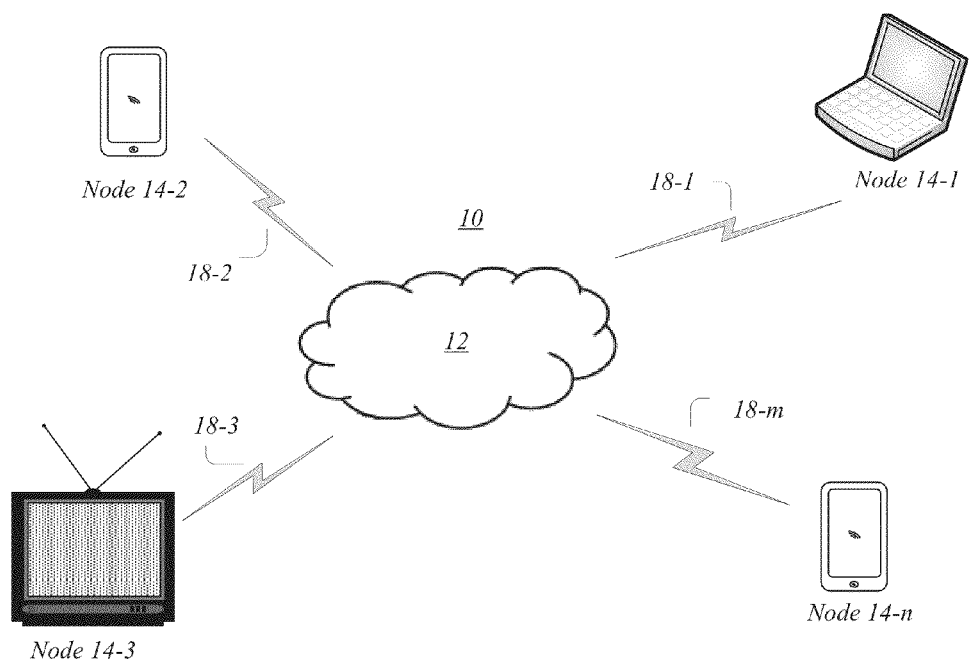
FIG. 1 illustrates one embodiment of a communications system.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

One challenge in communication systems employing MIMO is the ability to provide robust rank adaptation using channel state information (CSI) feedback. Rank adaption refers to the dynamic control of rank according to changing channel conditions. The channel conditions may be determined by such parameters as signal to interference and noise ratio (SINR) and fading correlation between antennae in a MIMO system. With the use of spatial multiplexing, a base station (or eNodeB, or eNB) may send multiple data streams or layers to UEs in a downlink transmission using the same frequency. The number of such layers or streams is defined as the rank. The UE may periodically measure a channel and send a recommendation of the rank to the eNB, referred to as the Rank Indicator (RI).

The RI may be sent periodically or aperiodically in different schemes. Because the reported to the eNB may change with time, the eNB may adjust the number of data streams used in a downlink transmission, based upon the changing RI received from the UE. However, several factors may render this process less than ideal. In some circumstances, the interference levels that may affect channel quality can change substantially between two successive RI reports, in which case, the eNB has no occasion to adjust the rank even though the last reported rank may not be appropriate due to the changed interference conditions. In other circumstances, when a so-called wideband rank is used, the rank indicator reported may be based upon an entire transmission band (wideband), which may be composed of a group of frequency sub-bands used for communications between the UE and eNB. In many cases, the interference conditions may vary substantially between different sub-bands within the wideband, thereby compromising the validity of a wideband RI reported by the eNB for individual sub-bands.

Another concern has been raised regarding the use of multiuser MIMO (MU-MIMO) where a UE may transmit (CSI) such as precoding matrix indicator/channel quality indicator (PMI/CQI) reports wherein the eNB can't extract the principle Eigen beam from the reported precoder to effectively support the most efficient MU-MIMO scheduling: In MU-MIMO an eNB may schedule multiple different UEs for transmission over the same transmission band. The reporting of channel state information (CSI) in a single user MIMO (SU-MIMO transmission) optimized for high rank reporting may arise as a consequence of the fact that the UE can only evaluate its own link performance, and in general is not aware of any co-scheduling candidates in the MU-MIMO scheme.

As a consequence, even though the link performance to a UE may be maximized by a high rank single user MIMO (SU-MIMO transmission), the system performance may very well be higher if the UE and a second terminal (unbeknownst to the UE) are co-scheduled using lower rank transmissions. The reported information including PMI/CQI/RI may therefore be matched to a MU-MIMO allocation. In particular, the terminal may often select a high rank precoder which doesn't contain the principle Eigen beam of the UE's channel. Thus, it is not beneficial for MU-MIMO scheduling.

One way for the UE to report a precoder which always contains the principle Eigen beam is to force the UE to report a rank 1 precoder regardless of the channel condition. In other circumstances, where the eNB prefers operating under SU-MIMO transmissions, the UE may report a rank of 1, although the eNB may prefer the UE to report an adapted rank, rather than always reporting a rank of 1.

FIG. 1 illustrates a block diagram of one embodiment of a communications system 10 that may include embodiments of the channel estimation architecture disclosed herein. As shown in FIG. 1, the communications system 10 may comprise a network 12 that communicates over links 18-$m$ with a plurality of nodes 14-$n$, where m and n may represent any positive integer value. In various embodiments, the nodes 14-$n$ may be implemented as various types of wireless devices. Examples of wireless devices may include, without limitation, a station, a subscriber station, abuse station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smart phone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, a multiplicity of devices in communications system 700 may employ multiple input and multiple output (MIMO) communications in which both receiver and transmitter employ multiple antennae. Some embodiments of a communications system may be implemented with a radio technology such as Institute of Electrical and Electronics Engineers (IEEE) 802.16 (WiMAX), evolved UTRA (E-UTRA), and so forth, IEEE 802.16m (2009) is an evolution of IEEE 802.16e (2005), and provides backward compatibility with an IEEE 802.16-based system. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) is an evolution of the 3GPP LTE. Released 3PP LTE specifications include Release 8 (2008), Release 9 (2009), and Release 10 (2011). For clarity, the following description may focus on embodiments related to LTE-A. However, other embodiments may employ other standards, as noted above.

Figure 2A:
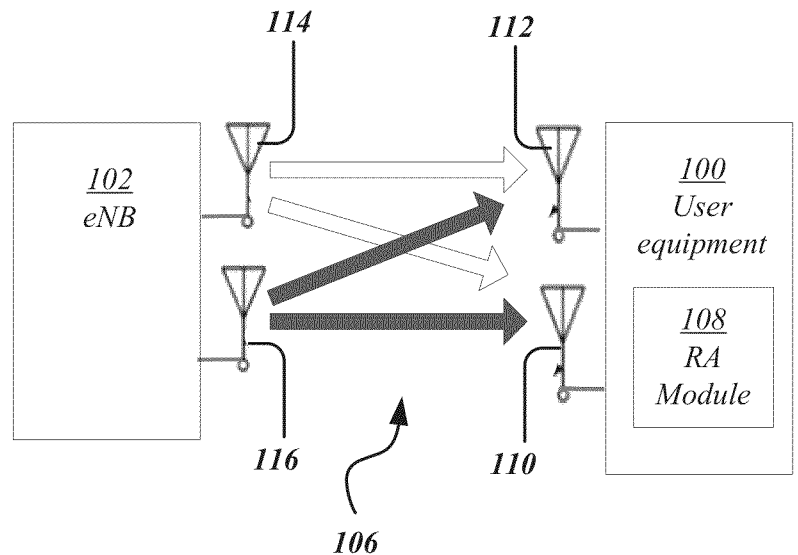
FIGS. 2a and 2b depict operation of a UE according to various embodiments.
Figure 2B:
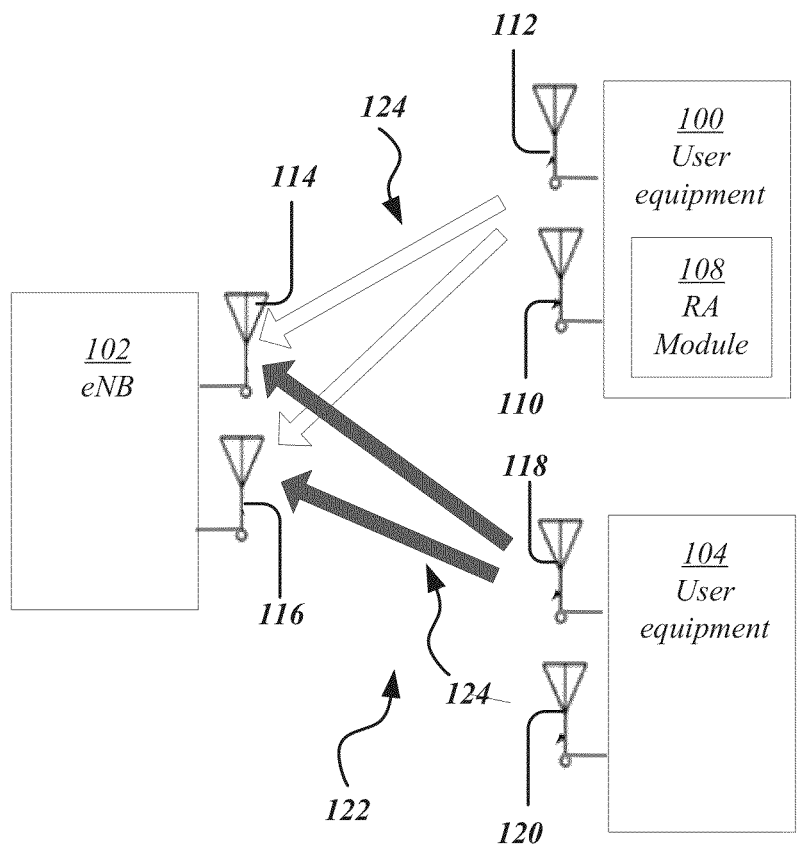

FIGS. 2$a$ and 2$b$ depict operation of a UE 100 according to various embodiments. The UE 100 may be scheduled to operate in either an SU-MIMO (FIG. 2$a$) or an MU-MIMO mode (FIG. 2$b$). In one implementation of an SU-MIMO mode depicted in FIG. 2$a$, an eNB 102 may transmit downlink signals 106 from each of two antennae 114, 116. As illustrated in FIG. 2$a$, each antenna 114, 116 transmits a signal to each of two UE antennas 110, 112. However, in some embodiments, LIE 100 and eNB 102 may each have additional antennas.

UE 100 may also operate in MU-MIMO mode, as depicted in FIG. 2$b$. UE 100 and a separate terminal (UE 104), which may operate in a conventional manner, are each depicted as transmitting respective signals 124 and 126 that form a portion of uplink signals 122 received by eNB 102 during an uplink communication. In the uplink communication depicted, signals 124 are sent from antenna 112 and may be received at antennae 114 and 116 of eNB 102. The signals 124 may be provided over a physical uplink control channel (PUCCH) or physical uplink shared channel (PUSCH) in various embodiments. Similarly, the additional UE device 104 transmits signals 126 from antenna 118, which may also be received at antennas 114, 116 of eNB 102. However, other configurations of MU-MIMO are possible.

In various embodiments, the uplink signals 124 sent from UE 100 may include control signals such as RI, PMI, and CQI, among others. At least some of the control signals transmitted by UE 100 may be reported in a regular periodic fashion or in an aperiodic fashion in different embodiments. In various embodiments, the UE is arranged to modify communications with the eNB in order to provide for robust rank adaptation using CSI feedback algorithms.

For example, UE 100 may operate in an environment in which interference changes substantially over time. The interference may take place in a rapid an unpredictable manner. It may therefore be desirable to change the rank reported to the eNB in a timely fashion to account for substantial interference changes that may alter the preferred rank. The UE 100 may include, for example, a CSI feedback module 108, which may perform various functions such as determining rank information to be reported based on a desired type of CSI feedback to be performed, as determined at a transmission station. In particular, the CSI feedback module 108 may implement the procedures and architecture depicted in FIGS. 3-6 and discussed below.

Figure 3:
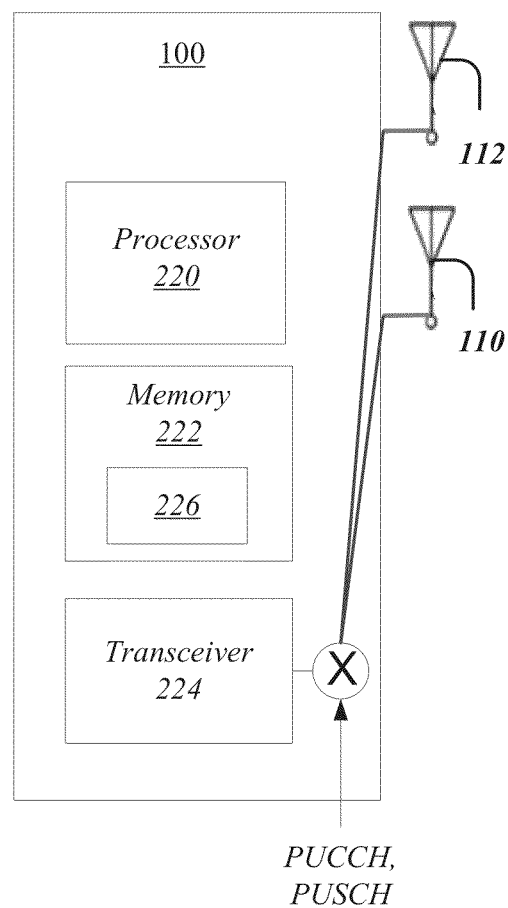
FIG. 3 depicts an embodiment of a UE.

FIG. 3 depicts an embodiment of a UE 100 that includes processor 220, memory 222, and transceiver 224. The antennas 110, 112 may serve both as transmitter (Tx) and receiver (Rx) antennae. The UE can include eight or more antennas. Memory 222 may include a codebook(s) 226, which may include multiple ranks, for example 8 ranks. In some embodiments, the codebook 226 may be arranged generally as provided for in LTE release 10. In other embodiments, the codebook 226 may be arranged generally as provided for in LTE release 8 or 9.

For a transmitter with four antennas (4Tx), the codebook 226 may have a nested structure, such that for each precoder matrix of a given rank there exists at least one corresponding column in all codebooks of ranks lower than the given rank. However, unlike the 4Tx codebook, which has the nesting structure and each rank has the same number of code words, the codebook for a transmitter with eight antennas (8Tx) can have a dual codebook structure. Each code word in the 8TX codebook can be identified by two indexes, referred to as $i_1$ and $i_2$. The 8Tx codebook can have a codebook size that decreases when the rank increases.

In one embodiment, the UE 100 may implement CSI feedback according to the following procedure to maximize the capacity of SU-MIMO. The UE 100 may perform channel measurements to determine various parameters described below. The processor 220 may perform a PMI search using codebook 226 according to $$i_r = v_i \in C_r^{argmax}(\text{trace}(v_i^H R v_i)) \quad (1)$$

where $C_r$ denotes a codebook having rank r, $v_i$ is a column in the codebook, H is a Hermetian transpose, R is the measured channel covariance matrix for a given band, and $i_r$ denotes the best PMI for rank r. After the best PMI for a given rank r is selected in accordance with equation (1), the UE may select the best rank $r_{best}$ to report to a base station or eNB.

In one embodiment, $r_{best}$ is determined according to $$r_{best} = 0 < r < r_{max}^{argmax}(\text{capacity}(v_{i_r}, H, SINR)) \quad (2)$$

where $v_{i_r}$ is the codebook column for the rank selected using (1), H is the channel matrix of interest, SINR is the signal-to-noise-and-interference ratio per each Rx antenna, and $r_{max} = \min(\text{numTx}, \text{numRx})$ is the maximum candidate rank for the least number of antennas at either the Tx antennas at transmission station (eNB) or the Rx antennas at the UE. Thus, after determining the SINR, the UE can calculate $r_{best}$ and report both the best rank and the best PMI for the best rank to an eNB. In this manner, in single user MIMO operation, the capacity of SU-MIMO may be maximized when rank adaptation is performed.

In further embodiments, the UE may implement CSI feedback and PMI selection to enhance MIMO operation in an environment in which dynamic switching between SU-MIMO and MU-MIMO operation may take place. This may improve upon current procedures where the codebook is designed for rank 1 PMI searches.

As is known, codebook-based precoding generally involves storing a codebook (i.e. the set of precoding matrices) at both the transmitter and the receiver in advance of a communications session. The receiver then may follow specified rules to select the optimal precoding matrix according to the current channel state and return the PMI of the selected matrix to the transmitter. However, previous codebooks, such as the LTE release 8 codebook, may not perform optimally in an MU-MIMO scenario or for dynamic switching between SU-MIMO and MU-MIMO.

In particular, under current codebook procedures, the best rank 2 PMI need not equal the best rank 1 PMI. Accordingly, current procedures for rank adaptation where high rank is reported may not result in the optimum PMI. As an example, when a UE performs rank adaptation and selects rank 2 for reporting, the UE needs to report one precoder and two channel quality indicators (CQI), each related to one column of the rank 2 precoder. In codebooks having a nested structure, such as the 4 Tx codebook specified by LTE release 8, all rank 2 precoders that have the same PMI value as that of a rank 1 will contain the corresponding rank 1 precoder as the first column in the rank 2 precoder. Although the rank 1 precoder coincides with a portion of the rank 2 precoder, this does not guarantee that the best rank 2 precoding matrix index will always equal the best rank 1 precoding matrix index.

To illustrate this problem further FIGS. 4a and 4b present a comparison of PMI distributions as specified by the LTE release 8 codebook. In particular, FIG. 4a shows the rank 1 PMI distribution 240, where the y-axis indicates the relative frequency for a given point of the distribution. The x-axis represents the different precoding matrix indices for the codebook. As depicted in FIG. 4a, the distribution 240 is relatively uniform. Between PMI values of zero to seven, the probability is about 10 to 15% for each index except for "2." As a result, when a UE performs a PMI search in rank 1 codebook, there is a great probability that the principle eigenvector will be chosen.

In contrast, FIG. 4b presents a rank 2 PMI distribution 250 based upon the LTE release 8 codebook. In this case, the PMI distribution 250 is much more non-uniform than the rank 1 PMI distribution 240. In particular, only PMIs "1," "3," and "8" have a significant probability, while all other PMIs have a probability of 5% or less. Accordingly, when a UE performs a PMI search in rank 2, there is a reasonable probability that two non-principal eigenvectors may have higher capacity than the principal eigenvector taken together with another vector orthogonal to the principal eigenvector. Thus, when an eNB receives a rank 2 PMI report and proceeds to extract the principal eigenvector from the rank 2 precoder, the eNB may not be able to find the principal eigen vector in the case of the higher capacity non-principal eigenvectors. Accordingly, rank adaptation between a rank 1 and rank 2 RI may not properly take place.

In accordance with further embodiments, the UE may be arranged to ensure that the rank 2 precoder always contains the principal eigenvector. In one implementation, this may be accomplished when the UE performs rank adaptation by determining the PMI only assuming rank 1. This is a reasonable approach since, as discussed above, all rank 2 precoders that have the same PMI value as that of a rank 1 by nature contain the corresponding rank 1 precoder. The RI may then be determined based upon use of the same PMI.

In order to determine the PMI for MU-MIMO, regardless of the reporting rank, the following procedure may be followed. The processor 220 may perform a PMI search using codebook 226 to quantize a principle Eigen vector using a rank 1 codebook:

$$i_0 = v_i \epsilon C_0^{argmax}(\text{trace}(v_i^H R v_i)) \quad (3)$$

where $i_0$ is a PMI for a rank 1 codebook, $C_0$ is the rank 1 codebook, R is a wide band channel covariance matrix, $v_i$ is a vector in the codebook, and H is the Hermetian conjugate. The principle Eigen vector of the channel can be quantized using $v_{i_0}$.

After the principle Eigen vector of the channel has been quantized using the rank 1 codebook, the processor 220 in the UE 100 can be configured to select the best PMI for other ranks ($r \neq 0$) by using each column of a high rank precoder (having multiple columns in the precoding matrix) to quantize the quantized principle Eigen vector $v_{i_0}$ according to:

$$i_r = (v_i \epsilon C_r^{argmax}(\max|v_i^H v_{i_0}|)) r \neq 0 \quad (4)$$

where $i_r$ is a PMI for a rank r codebook, $C_r$ is the codebook of rank r, $v_i$ is a column in the codebook, H is the Hermetian conjugate, and $\max|v_i^H v_{i_0}|$ is the maximum cross correlation between each column of the high rank precoder $v_i$.

It should be noted that (4) is only one example of a means to determine an MU-MIMO optimized PMI for a rank greater than one. Another example of a search MU-MIMO process that is optimized high rank PMI is to test each individual column of each high rank precoder as if it is a rank 1 precoder and select the high rank precoder which contains the column resulting in the highest performance metrics.

After the best PMI for each rank is selected, the processor 220 in the UE 100 can be configured to perform rank adaptation according to:

$$r_{best} = 0 < r < r_{max}^{argmax}(\text{capacity}(v_{i_r}, H, SINR)) \quad (5)$$

where $v_{i_r}$ is a column in the codebook, H is the channel matrix of interest, SINR is the signal-to-noise-plus-interference ratio for each Rx antenna, and $r_{max} = \min(\text{numTx}, \text{numRx})$ is the maximum candidate rank tier the least number of antennas at either the Tx antennas at transmission station (eNB) or the Rx antennas at the UE.

The process of performing rank adaptation using (3), (4), and (5) can be used by any number of Tx antennas. The PMI/RI search algorithm for 4TX antennas that was described in the parent application, United States patent application Serial No. PCT/US2011/053683, is a special case of this process, where the 4Tx codebook has a nesting structure. Accordingly, (4) can be simplified for the 4Tx codebook by setting the high rank PMI value to be the same as the rank 1 PMI which best quantizes the principle Eigen vector.

The use of the two different processes: one process for SU-MIMO RI/PMI calculation (using (1) and (2)); and another process for MU-MIMO RI/PMI calculation (using (3), (4) and (5)), allows switching between the two processes to provide a selected process to be used based on conditions. The optimal MIMO transmission scheme at the base station or eNB can be dependent on the instantaneous traffic load. When a large number of active UE's exist in one cell, it can be beneficial for the eNB to perform MU-MIMO in order to boost the system throughput.

On the other hand, when a small number of active UEs exist in one cell, or there is insufficient spatial separation among the active UEs, SU-MIMO can perform better. Each UE can perform a CSI feedback calculation according to its observation on the downlink channel from the serving eNB. When the downlink geometry SINR is high, the UE tends to report more high rank CSI reports. On the other hand, when the downlink geometry is low, the UE tends to report more low rank CSI reports. Geometry SINR reflects the average signal to interference plus noise power ratio for a UE. Typically, at a UE located near a cell center, the geometry SINR is high. For a UE located at a cell edge, the geometry SINR can be relatively low. The CSI ill-match problem happens when many active UEs report SU-MIMO optimized high ranks CSI, but the eNB wants to perform MU-MIMO transmission.

The ill-match problem increases due to the current rank adaptation and PMI search algorithms, which are optimized for SU-MIMO. Thus, when there is a high probability that a UE will report high rank precoders which don't contain the principle Eigen vector for the UE. Accordingly, the two rank adaptation and PMI selection processes can be used. The first process (using (1) and (2)) can be in favor of SU-MIMO. The second process (using (3), (4) and (5)) can be in favor of MU-MIMO. Depending on the instantaneous load conditions that the eNB observes, the eNB can send signaling to the active UE's within the cell to identify which rank adaptation and PMI selection process it prefers.

In one embodiment, the eNB can be configured to support dynamic switching between the SU-MIMO rank adaptation and PMI selection process by the UE using (1) and (2), and the MU-MIMO rank adaptation and PMI selection process by the UE using (3), (4) and (5). The dynamic switching is referred to as channel state information (CSI) feedback switching.

In one embodiment, a dynamic CSI feedback switch can be broadcast from the eNB. In another embodiment, the CSI feedback switch can be conveyed from the eNB to each UE via unicast signaling, though this may be more burdensome on overhead at the eNB. The information may be broadcast using a single bit, such as high for MU-MIMO and low for SU-MIMO, or vice versa. Two bits may be used to convey additional information. For example, selected MIMO modes such as Coordinated Multi-Point (CoMP) or Distributed Antenna System (DAS) may be conveyed using two bits. If the information does not arrive at a UE, the erasure of the CSI feedback switch signaling will only cause the UE to select a sub-optimal RI/PMI search algorithm, but won't break the communication. Thus, a relatively loose bit error rate (BER) target may be used. For instance, a requirement that the signal is communicated with a 1% BER at a normal cell edge geometry with an SINR of −4 dB may be implemented. Since the traffic load and interference level at an eNB can change quite often, the dynamic CSI feedback switch signal can be communicated in every subframe of a 3GPP orthogonal frequency division multiple access (OFDMA) frame structure.

In one embodiment, a new broadcasting physical channel can be added to communicate a dynamic RI/PMI calculation switch signal from an eNB to the active UE's located within the cell. The active UE's are those UE's configured to communicate with the eNB through physical downlink channels. The new broadcasting channel may be referred to as a physical channel state information feedback indicator channel (PCSIFICH).

The PCSIFICH can operate similarly to the physical control format indicator channel (PCFICH) defined in the 3GPP LTE specification. The PCFICH is a downlink physical channel which carries a Control Format Indicator (CFI) which indicates the number of OFDM symbols (i.e. normally 1, 2 or 3) used for transmission of downlink control channel information in each subframe.

Figure 5:
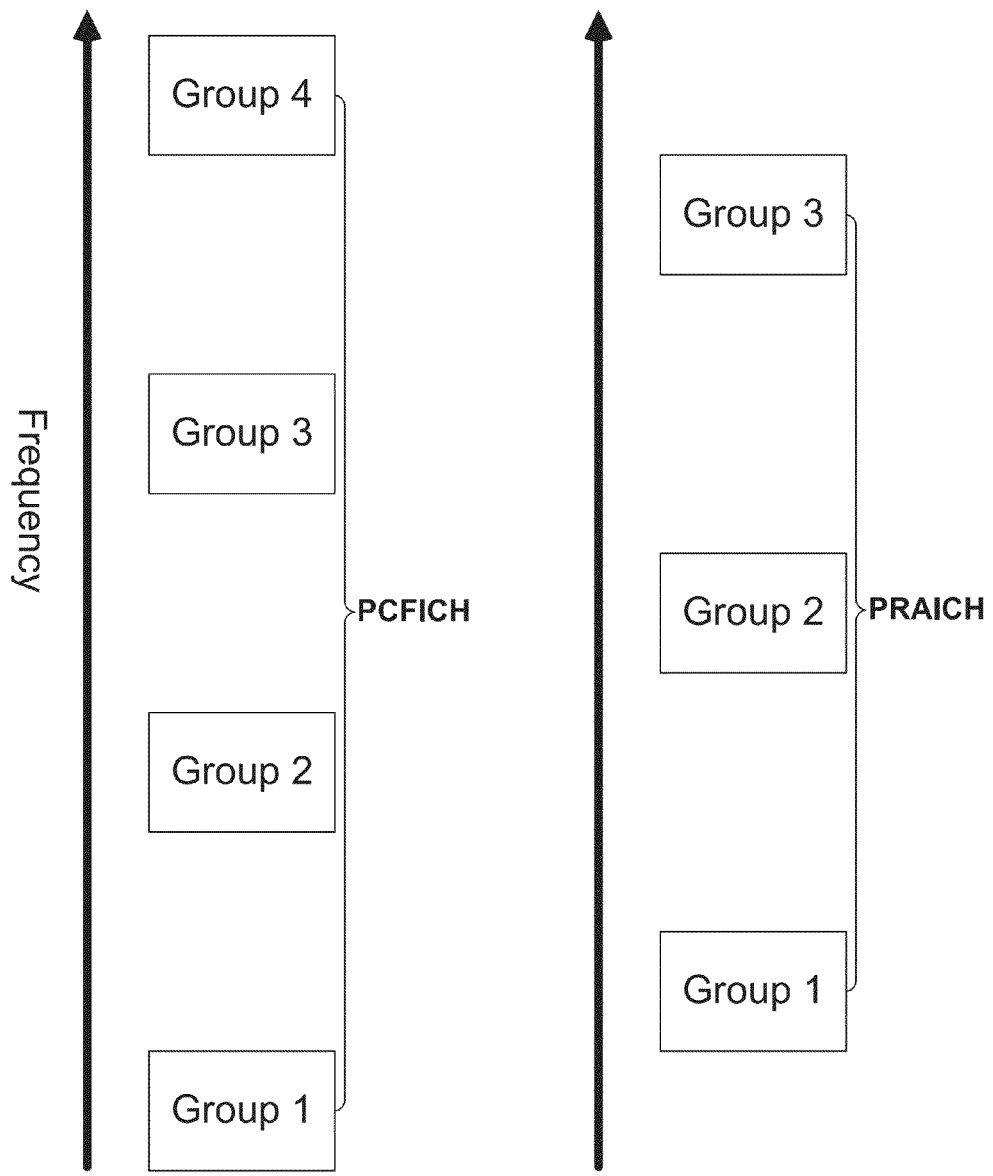
FIG. 5 depicts a communication of a physical channel state information feedback indicator channel (PCSIFICH)

According to the 3GPP LTE Rel. 8/9/10, the PCFICH can convey two bits. These two bits are used to modulate four sequences, with each sequence having a length of 32 bits. These 32 bits can be quadrature phase shift key (QPSK) modulated into 16 QPSK symbols. The 16 QPSK symbols are further grouped into four groups, with each group having four QPSK symbols. All four groups can be mapped into the first OFDM symbol and communicated by the eNB to each UE, as illustrated in FIG. 5. The diversity mapping can be used in order to gain frequency diversity. The start mapping position can have a cell specific offset in order to mitigate inter-cell interference among PCFICH data from neighboring cells.

Since the requirements for receiving the PCSIFICH are relatively low compared with the PCFICH, the channel structure of the PCFICH can be changed to define the new PCSIFICH. For example, one bit signaling can be used to modulate two sequences. The two sequences can each have a length of 24 bits. The 24 bits can be QPSK modulated to create 12 QPSK symbols. The 12 QPSK symbols can be separated into three groups, as shown in FIG. 5 and mapped to the first OFDM symbol for transmission. This example is not intended to be limiting. A different number of bits, sequences, length of sequences, and groups may be used based on system requirements, as can be appreciated.

In another embodiment, a one bit CSI feedback switch indicator signaling can be mapped to the physical hybrid automatic repeat request (ARQ) indicator channel (PHICH). The PHICH is a downlink physical channel which carries the Hybrid ARQ (HARQ) ACK/NACK information indicating whether the eNodeB has correctly received a transmission on the physical uplink shared channel (PUSCH). Since the PHICH is designed to carry 1 bit ACK/NAK signaling bits, the CSI feedback switch indicator signaling information can be assigned to be carried on one or two reserved locations on the PHICH.

In another embodiment, the CSI feedback switch indicator signaling information can be added to a system information block (SIB). Since the system information block is broadcasted, one or more fields can be defined in a SIB. For example, one bit can be defined for one subframe subset of a SIB designated for use with enhanced inter-cell interference coordination (e-ICIC), as defined in the 3GPP LTE Rel. 10 (2011).

In another embodiment, the CSI feedback switch indicator signaling information can be included in radio resource control (RRC) signaling. However, this will change the delivery mechanism for CSI feedback switch indicator signaling from broadcasting to unicast, which may not be preferred. Every time a scheduler changes its preference in rank adaptation methods, it would need to poll all of the active UEs to configure them one by one. This can be relatively slow and require large amounts of overhead in a radio access network (RAN). Thus, one of the broadcast or multicast methods may typically be used.

Figure 6:
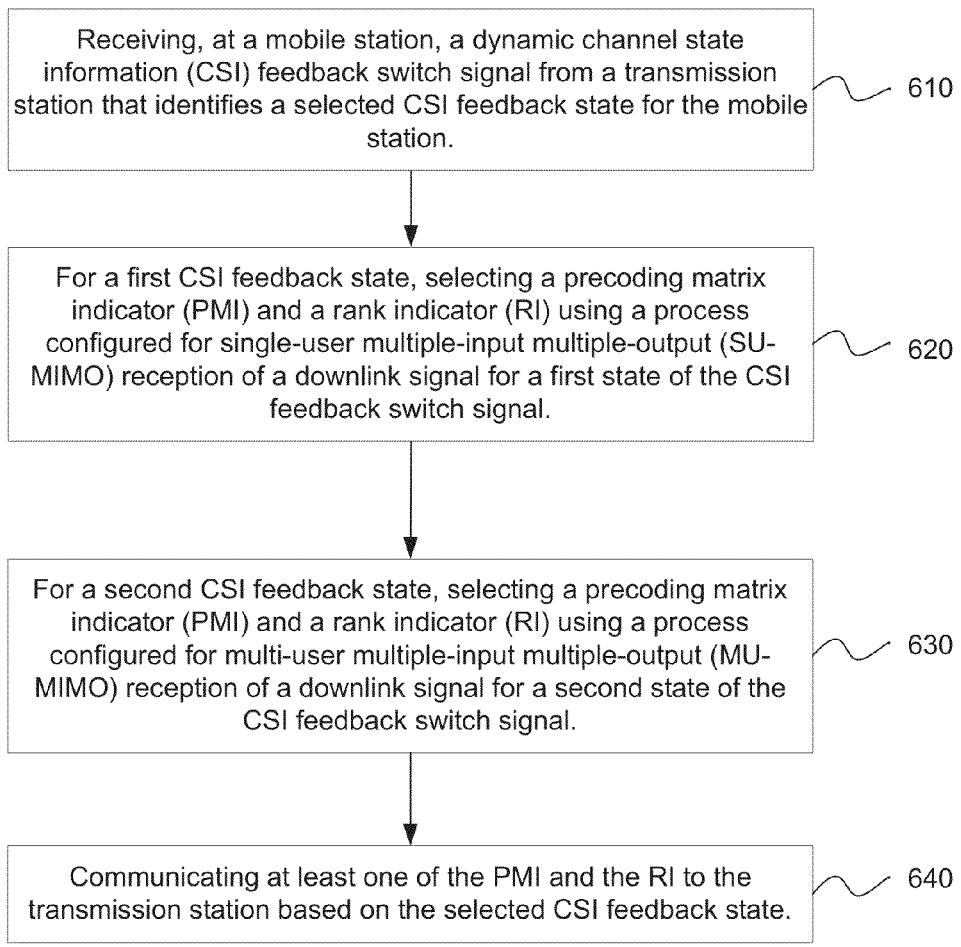
FIG. 6 depicts a method for selecting a channel state information (CSI) feedback process in a MIMO communication.

In another embodiment, a method 600 for selecting CSI feedback in a multiple-input multiple-output (MIMO) communication system is disclosed, as depicted in the flow chart of FIG. 6. The method comprises receiving, at a mobile device, a dynamic channel state information (CSI) feedback switch signal from a transmission station, as shown in block 610. The CSI feedback switch signal can identify a selected CSI feedback state for the mobile station. A precoding matrix indicator (PMI) and a rank indicator (RI) are selected using a process configured for single-user (SU) MIMO reception of a downlink signal for a first state of the CSI feedback switch signal, as shown in block 620. A PMI and RI are selected using a process configured for multi-user (MU) MIMO reception of a downlink signal for a second state of the CSI feedback switch signal, as shown in block 630. At least one of the PMI and the RI are communicated to the transmission station, wherein the PMI are RI are calculated using the selected CSI feedback state.

Figure 7:
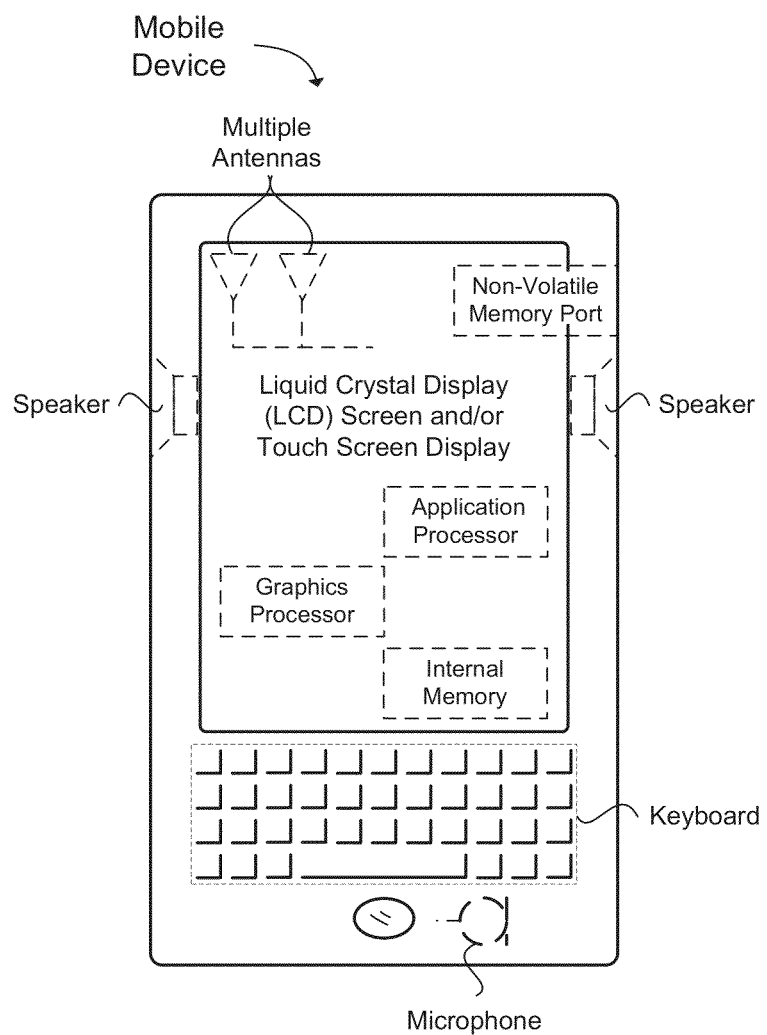
FIG. 7 illustrates an example of a block diagram of a mobile communication device.

FIG. 7 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), wireless personal area network (WPAN), and/or a wireless wide area network (WWAN).

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus, comprising:
   a receiver arranged to receive wireless downlink communications comprising one or more data streams over a transmission band, each transmission characterized by a rank r specifying a number of data streams to be simultaneously communicated over the transmission band in multi-user multiple-input multiple output (MU-MIMO);
   a memory containing a multiple rank codebook;
   a processor; and
   a CSI feedback module operable on the processor to:
      quantize a principle Eigen vector in a precoding matrix index $i_0$ for lowest rank transmissions;
      set a precoding matrix index $i_r$ for a higher level rank transmission based upon the principle Eigen vector and a maximum cross correlation of each column of the codebook with the principle Eigen vector to identify a selected precoding matrix indicator (PMI) for the higher level rank transmission; and
      select a rank for receiving the downlink communications based on the PMI for the higher level rank transmission.

2. The apparatus of claim 1, the processor arranged to determine $i_0$ according to:

$$i_0 = v_i \in C_0^{argmax}(\text{trace}(v_i^H R v_i)$$

where $i_0$ is a PMI for a rank 1 codebook, $C_0$ is the rank 1 codebook, R is a wide band channel covariance matrix, $v_i$ is a column in the codebook, and H is the Hermetian conjugate.

3. The apparatus of claim 1, the processor arranged to select a PMI for a rank r codebook according to:

$$i_r = (v_i \in C_r^{argmax}(\max |v_i^H v_{i_0}|)) r \neq 0 \quad (4)$$

where $C_r$ is a codebook of rank r, $i_r$ is a PMI for the rank r codebook, $v_i$ is a column in the codebook, H is the Hermetian conjugate, and $\max |v_i^H v_{i_0}|$ is a maximum cross correlation between each column $v_i$ in the codebook.

4. The apparatus of claim 1, the processor arranged to select a rank $r_{best}$ according to:

$$r_{best} = 0 < r < r_{max}^{argmax}(\text{capacity}(v_{i_r}, H, SINR))$$

where $v_{i_r}$ is a column in the codebook, H is a channel matrix of interest, SINR is a signal-to-noise-plus-interference ratio for each Rx antenna, and $r_{max} = \min(\text{numTx}, \text{numRx})$ is a maximum candidate rank for a least number of antennas at one of transmit antennas at a transmission station and receive antennas at the apparatus.

5. The apparatus of claim 1, wherein the multiple rank codebook is configured for n antennas, wherein n=2 to 8.

6. The apparatus of claim 1, wherein the multiple rank codebook is configured for 8 antennas.

7. An article, comprising a non-transitory computer-readable storage medium containing instructions that if executed by a processor enable a system to:
   determine a precoding matrix indicator (PMI) and a rank indicator (RI) using a first process configured for single-user multiple-input multiple-output (SU-MIMO) reception of a downlink signal;
   determine a precoding matrix indicator (PMI) and a rank indicator (RI) using a second process configured for multi-user multiple-input multiple-output (MU-MIMO) reception of a downlink signal, wherein the second process is different from the first process;
   receive a dynamic channel state information (CSI) feedback switch signal from a transmission station identifying one of the first process for SU-MIMO or the second process for MU-MIMO to determine a PMI to report and an RI to report; and
   communicate at least one of the PMI to report and the RI to report to the transmission station, wherein the PMI to report and RI to report are determined using one of the first process or the second process identified from the CSI feedback switch signal, wherein the second process includes:
      quantizing a principle Eigen vector in a precoding matrix index $i_0$ of a codebook for lowest rank transmissions;
      setting a precoding matrix index $i_r$ for a higher level rank transmission based upon the principle Eigen vector and a maximum cross correlation of each column of the codebook with the principle Eigen vector to identify a selected precoding matrix indicator (PMI) for the higher level rank transmission; and
      selecting a rank for receiving downlink communications based on the PMI for the higher level rank transmission.

8. The article of claim 7, further comprising instructions that when executed by a processor enable the system to receive the dynamic CSI feedback switch signal that is broadcast from a transmission station that is an enhanced Node B.

9. The article of claim 7, further comprising instructions that when executed by a processor enable the system to receive the CSI feedback switch signal in a physical CSI feedback indicator channel (PCSIFICH).

10. The article of claim 9, further comprising instructions that when executed by a processor enable the system to receive the dynamic CSI feedback switch signal in the physical CSI feedback indicator channel (PCSIFICH), wherein the CSI feedback switch signal is comprised of three groups of 4 quadrature phase shift key (QPSK) symbols each.

11. The article of claim 7, further comprising instructions that when executed by a processor enable the system to receive the dynamic CSI feedback switch signal mapped to a physical hybrid automatic repeat request (ARQ) indicator channel (PHICH) communicated by the transmission station.

12. The article of claim 7, further comprising instructions that when executed by a processor enable the system to receive the dynamic CSI feedback switch signal mapped to a system information block (SIB).

13. The article of claim 7, further comprising instructions that when executed by a processor enable the system to receive the dynamic CSI feedback switch signal in radio resource control (RRC) signaling that is unicast from the transmission station.

14. A method for selecting CSI feedback in a multiple-input multiple-output (MIMO) communication system, comprising:
   receiving, at a mobile station, a dynamic channel state information (CSI) feedback switch signal from a transmission station that identifies a selected CSI feedback state for the mobile station;
   for a first CSI feedback state, selecting a precoding matrix indicator (PMI) and a rank indicator (RI) using a first process configured for single-user multiple-input multiple-output (SU-MIMO) reception of a downlink signal for a first state of the CSI feedback switch signal;
   for a second CSI feedback state, selecting a precoding matrix indicator (PMI) and a rank indicator (RI) using a second process configured for multi-user multiple-input multiple-output (MU-MIMO) reception of a downlink signal for a second state of the CSI feedback switch signal, wherein the second process is different from the first process; and communicating at least one of a PMI to report and an RI to report to the transmission station, wherein the PMI to report and RI to report are determined using one of the first process or the second process based on the selected CSI feedback state, wherein the second process includes:

quantizing a principle Eigen vector in a precoding matrix index $i_0$ of a codebook for lowest rank transmissions;

setting a precoding matrix index $i_r$ for a higher level rank transmission based upon the principle Eigen vector and a maximum cross correlation of each column of the codebook with the principle Eigen vector to identify a selected precoding matrix indicator (PMI) for the higher level rank transmission; and selecting a rank for receiving downlink communications based on the PMI for the higher level rank transmission.

15. The method of claim 14, further comprising receiving the dynamic CSI feedback switch signal that is broadcast in a physical CSI feedback indicator channel (PCSIFICH).

16. The method of claim 15 further comprising receiving the dynamic CSI feedback switch signal that is broadcast in a physical CSI feedback indicator channel (PCSIFICH), wherein the CSI feedback switch signal is comprised of three groups of four quadrature phase shift key (QPSK) symbols each.

17. The method of claim 14, further comprising receiving the dynamic CSI feedback switch signal that is mapped to a physical hybrid automatic repeat request (ARQ) indicator channel (PHICH) broadcast by the transmission station.

18. The method of claim 14, further comprising receiving the dynamic CSI feedback switch signal that is mapped to a system information block (SIB) broadcast by the transmission station.

19. The method of claim 14, further comprising receiving the dynamic CSI feedback switch signal in radio resource control (RRC) signaling that is unicast by the transmission station.

* * * * *